Feb. 20, 1951   L. K. BULLMAN ET AL   2,542,473
CUTTING TORCH HOLDER

Filed March 18, 1949   2 Sheets-Sheet 1

INVENTOR.
Louis K. Bullman
and Shirl Underwood
BY
Mason, Fenwick & Lawrence
Attorneys

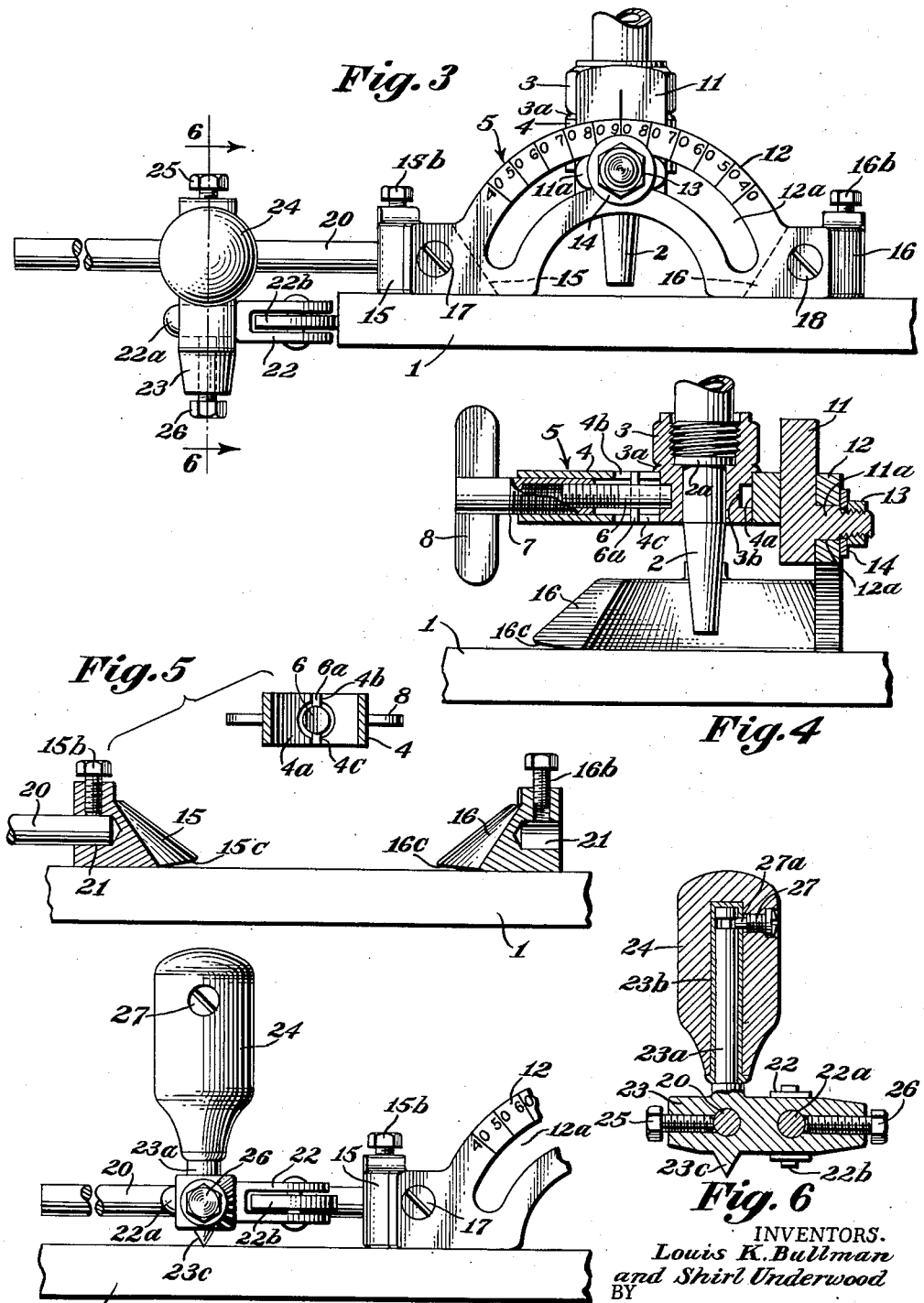

Patented Feb. 20, 1951

2,542,473

UNITED STATES PATENT OFFICE 2,542,473

CUTTING TORCH HOLDER

Louis K. Bullman and Shirl Underwood,
Norfolk, Va.

Application March 18, 1949, Serial No. 82,212

3 Claims. (Cl. 266—23)

This invention relates to a cutting torch holder and, more particularly, to improvements in a cutting torch holder for permitting a wide variety of adjustments in the support of a cutting torch, particularly angular and vertical adjustments, together with accessories for facilitating guiding of the holder along templates, straight edges or the edge of the work to be cut.

This application is a continuation-in-part of our copending application, Serial No. 14,924, filed March 15, 1948, entitled "Cutting Torch Holder," now Patent No. 2,514,741, issued July 11, 1950.

Holders or carriages for adjustably supporting cutting or blow torches are broadly old in the art. However, common types of holders have the disadvantage of not providing sufficient adjustments for accommodating different diameters and lengths of torch tips. Furthermore, they do not provide satisfactory vertical and angular adjustments to provide the proper distance between the torch and work for different types of torch tips and to permit cutting at an angle to provide bevelled edges on the work.

Another disadvantage of common types of holders is that they are not readily adaptable for guidance by either straight or curved templates or by rules or by the work itself. A further disadvantage of common types of torch holders or carriages is that they are generally cumbersome in construction and expensive to manufacture.

While our above identified co-pending application describes a novel torch holder that is devoid of the above named disadvantages of common types of holders, the present invention relates to an improvement for allowing replaceability of torch tips and for selectively supporting the torch tip for either straight line or circular cutting; also it relates to an improved handle means which is rotatably mounted on its axis to facilitate guiding of the holder for either type of cut.

An object of the present invention is to provide a cutting torch holder with a radius rod adjustment and freely rotatable adapter nut for supporting the torch tip to enable cutting circles of selectively different radii and, alternately, for providing a guide or gauge for guiding the holder along the edge of the work to be cut to enable cutting of strips from the work.

A still further object of this invention is to provide a novel torch holder including an adapter nut for making the holder instantly attachable to any size of torch tip and to permit the operator to lock the torch tip or nozzle in position for straight line cutting or, by a slight release of the holder clamp normally clamped to the adapter nut, to adjust the holder for circular cutting.

A still further object of this invention is to provide in a guide means for a torch holder, a wheel for rolling along the edge of the work to facilitate guiding when it is desired to cut strips of material from the work.

A still further object of this invention is to provide an improved torch holder wherein the guiding handle is readily rotatable about its axis so as to facilitate turning of the holder about a center on which the holder is pivoted when it is desired to make circular cuts.

Other objects and advantages will become apparent from a study of the following specification and claims taken in conjunction with the accompanying drawings, in which:

Figure 3 is an end view of the structure shown in Figures 1 and 2 showing the guide roller in position so as to roll along the edge of the work.

Figure 4 is a cross sectional view taken along line 4—4 of Figure 1.

Figure 5 is a cross sectional view taken along line 5—5 of Figure 1;

Figure 6 is a cross sectional view taken along line 6—6 of Figure 3; and

Figure 7 is an end view similar to Figure 3 with parts shown broken away except that the handle is turned to move the pivot point downwardly in position to serve as a center about which the holder is rotated for making circular cuts.

Figure 1:
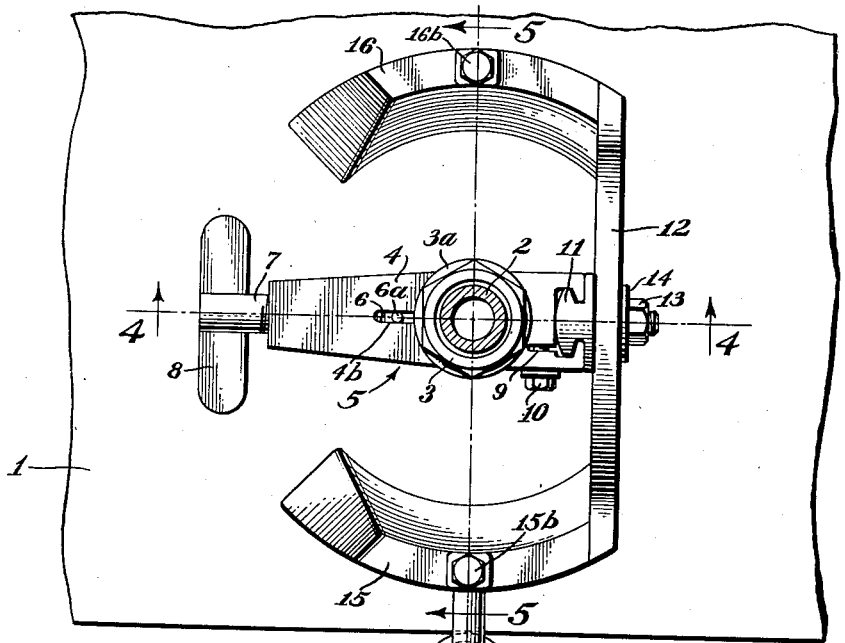
Figure 1 is a top or plan view of a cutting torch holder together with a sliding gauge to selectively permit guidance of the holder either along the edge of the work piece for cutting strips or about a pivot point for cutting circular pieces and which involves principles of the present invention.
Figure 2:
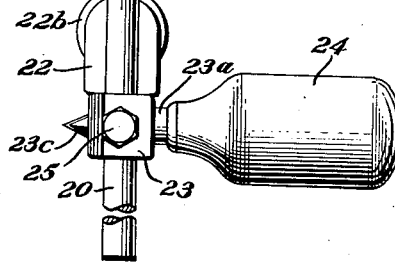
Figure 2 is a front elevational view of the structure shown in Figure 1.
Figure 2:
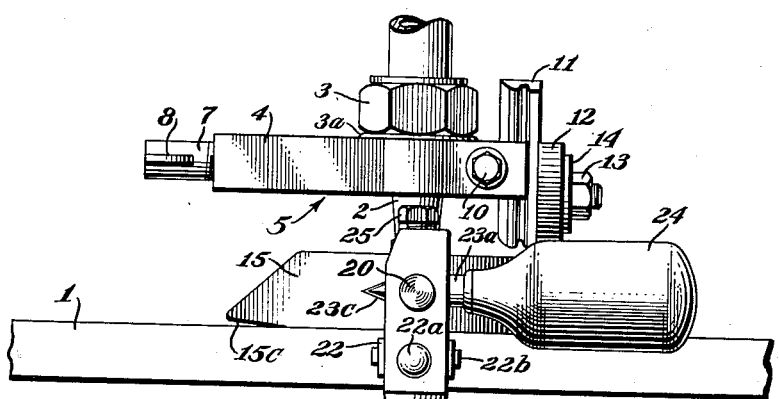

Referring more particularly to Figures 1, 2 and 3 of the drawing, numeral 1 denotes the work to be cut (or welded) by a blow torch (not shown) and numeral 2 denotes the tip of such torch, which tip is of well known construction, having a somewhat tapered nozzle having openings at the bottom thereof through which emerges the flame.

An important improvement of the present invention over that described in our earlier filed above identified application resides in the provision of a special adapter nut 3 having a flange portion 3a which rests upon the top surface of a support plate 4 of a special torch cradle 5. Torches made by the different manufacturers vary in size. Therefore the present invention contemplates that a separate special adapter nut 3 will be provided to fit each different make of torch. Although the internally threaded portion of these special adapter nuts would be adapted to fit a particular size and make of torch, the outsides of all these special adapter nuts would be of the same size and shape and all would have the flange 3a of the same diameter. All of the special adapter nuts 3 are adapted to be appropriately attached to the cradle 5 with the lower part of the adapter nut disposed within a hole 4a in the plate 4. When it is desired to change the size of the nozzle or tip 2 whose collar 2a rests upon a shoulder portion of the adapter nut, it is merely necessary to unscrew the adapter nut 3 and to replace the tip with a new one of the desired diameter or length and then to screw the adapter nut 3 onto the end of the torch so as to clamp the tip thereto. To this end all of the special adapter nuts 3 are provided with an annular groove 3b on the portion of the adapter nut which engages the hole 4a. A plunger 6 is screw threadedly mounted with respect to a bore in the plate 4 of the cradle so that one end of the plunger may be projected into or out of annular groove 3b. To this end the outer end of the sleeve 6 is screw threaded to an internally threaded sleeve 7. This sleeve 7 is screw threadedly engaged in the bore formed in the cradle and the travel of its threads are opposite to its internal threads which engage the external threads on the plunger 6. The sleeve 7 is provided with a suitable hand wheel or wing nut 8 by which the sleeve may be rotated. The ends of a radially extending pin 6a which extends through the plunger 6 are guided by longitudinally extending slots 4b and 4c formed in the upper and lower portions of the plate 4 of the cradle to provide pin and slot connections to guide the plunger toward and away from clamping engagement with the special adapter nut 3 without permitting rotation of the plunger 6. It will be readily apparent that rotation of the hand wheel or wing nut 8 will adjust the position of the inner end of the plunger 6.

It will therefore be seen that for cutting along straight lines, using runner 15 or 16 as a guide which is slid along a rule or template, wing nut 8 is tightened and plunger 6 is firmly clamped to the grooved portion of adapter nut 3. However, when it is desired to make circular cuts, a slight unscrewing of wing nut 8 will allow free rotational movement of the adapter nut 3 and cutting torch assembly within the cradle 4, that is, it will allow rotational movement of adapter nut 3 with respect to the inwardly projecting end of plunger 6, permitting the operator to cut a complete circle without backing around his work and without having to drag the oxy-acetylene hose around or over the table or the work.

Vertical adjustment is provided for the cradle by a slot 9 and a nut 10, tightening of which nut brings closer together integral end portions of the cradle so as to clamp the slotted or keyed end portions of the cradle to a vertically extending guide member or bed plate 11. Thus, by unscrewing nut 10 so as to unclamp the keyed end portions of the cradle the entire cradle may be raised or lowered to the proper vertical height, depending upon the length of blowtorch tip used. Then, by tightening the nut, the cradle end portions are clamped to the keyed portion of the bed plate 11 and firmly held in any desired vertical position.

Angular adjustment is provided for the cutting torch holder by means of a protractor plate 12 which is calibrated through an arc of about 180° so as to provide angular adjustment of about 45° on either side of the vertical. An arcuate slot 12a is provided in the plate into which extends a somewhat elliptical protuberance 11a integrally formed on bed plate 11 and which is guided along the slot. By unscrewing a nut 13 away from the washer 14 the entire cradle assembly, including plate 11 may be moved in an arcuate path along the protractor so as to dispose the cradle and blowtorch tip at any desired angle with respect to the work 1. After the desired angle has been obtained, the nut 13 is tightened so as to firmly hold the assembly in place in the desired angular position. The torch will thus cut the work at selectively different angles so as to obtain beveled edges.

Secured to the ends of protractor plate 12 are a pair of curved guides or runners 15 and 16. These are fastened to the protractor plate by means of screws 17 and 18, respectively. The outer surface of these runners are in the arc of a circle of a radius measured from the center of the adapter nut 3. By reason of the radius of the circle mentioned it will be seen that the runners serve to maintain the nozzle or tip 2 at a constant distance from the edge of the work against which either of the runners may engage despite any rotational movement of the carriage 5 which might be incidental to the operator's movements. Therefore the curved runner construction enables easy guiding of the holder and tip 2 along either straight or arcuate paths. As will be shown in Figure 2, the underside of the outer tips of the runners are slightly beveled as at 15c and 16c. The purpose of this is to make it easier to slide the carriage over surfaces which might have slight irregularities or projections.

When it is desired to cut off strips of metal from the work 1, an attachment such as shown at the bottom of Figure 1 is provided, including a radius rod 20 which may be extended into holes 21 extending into either of the runners 15 or 16 and clamped thereto by threaded bolt 15b or 16b, together with a rolling gauge yoke 22 having stud 22a. Rods 20 and 22a extend through holes in an angularly shaped member 23.

Angular shaped element 23 has a stud or shank portion 23a (see Figure 6) which projects through a metal sleeve 23b tightly fitted in a cylindrical opening formed longitudinally of handle 24. Set screw 27 extends through one side of the handle and sleeve and has an integral pin portion 27a at the end thereof which extends into a peripheral groove formed in stud portion 23a, allowing free rotation of the handle 24 about the axis of stud portion 23a to facilitate turning or rotation of the torch holder about a pivot point or punch 23c whenever it is desired to make circular cuts.

The angular shaped element 23 is clamped onto rod 20 in adjustable angular positions by means of a screw threaded bolt 25 as shown in Figure 6.

In operation when it is desired to cut a strip off the end of a work piece, the angular shaped member 23 is clamped in the position shown in Figure 3, that is so that the roller 22b will roll along the edge of the work 1.

When it is desired to make circular cuts of the material, it is necessary to unscrew bolt 25 and to rotate the angular shaped element 23 ninety degrees (90°) about the axis of rod 20 from the position shown in Figure 3 to that shown in Figure 7. In this latter position the pivot point 23c integrally formed on member 23 extends downwardly and fits into a punch mark in the surface of the work so as to serve as a center about which the torch holding assembly may be rotated for making circular cuts. It will be readily understood that before making the circular cut it would be necessary that the plunger 6 be adjusted so that the adapter nut 3 is free to rotate in carriage plate 4 with the inner end of plunger 6 projecting slightly into groove 3b so that the nut 3 and carriage plate 4 cannot be separated. The rotative movement of handle 24 about its axis greatly facilitates rotary turning of the torch holding assembly. Also by loosening set screw 26 and rotating roller yoke 22 about the axis of stud 22a through 90° roller 22b will have added clearance.

Thus, it will be seen that the present invention provides a highly efficient, relatively simple and inexpensive cutting torch holder or carriage which is adapted for a wide variety of adjustments of the torch tip, particularly angular and vertical, and which can accommodate different diameters and lengths of torch tips so that regardless of the design of tip the proper distance is maintained between the flame emerging end of the torch tip and the work; also the invention provides suitable slides and guiding means for guiding the torch tip holder along straight edges, arcuate or straight templates, along the edge of the work to be cut, or along a circular path, as desired.

While for purposes of illustration only one embodiment of the invention is shown and described it will be readily apparent that other modifications will be suggested to those skilled in the art after having had the benefit of the teachings of the present disclosure. However, the invention should be restricted only insofar as the scope of the appended claims.

What is claimed is:

1. A cutting torch holder adapted to slide on the surface of the work comprising a pair of transversely spaced runners for engaging the surface of the work and a cradle disposed above and between said runners having a hole portion for receiving a torch tip, said spaced runners having lateral surfaces for guiding engagement with a template edge and describing arcs of a circle of constant radius about the axis of said hole, protractor means for angularly adjusting said cradle to vary the position of the torch relative to the work, means for providing vertical adjustment of said cradle, an adapter nut for screw threaded engagement with the torch for coupling the torch tip thereto and including a shoulder portion which rests on top of said cradle and a peripherally grooved portion adapted to be inserted in said hole, and plunger means screw-threadedly mounted on said cradle for selectively coupling or uncoupling said cradle and adapter nut and including a plunger end portion which is radially movable into and away from said peripheral groove.

2. A cutting torch holder adapted to slide on the surface of the work comprising, a pair of transversely spaced runners for engaging the surface of the work, transverse means intercoupling said spaced runners and having a cradle member extending therefrom disposed above and between said runners, said cradle member having a hole formed therein for receiving a torch tip, said spaced runners having outer guide surfaces describing arcs of a circle of a constant radius from the axis of said hole, an adapter nut for screw-threaded engagement with said torch for coupling the torch tip thereto and having abutment means limiting insertion of said torch tip through said hole, said adapter nut having a peripherally grooved portion adapted to be disposed in said hole, and axially movable plunger means for selectively coupling or uncoupling said cradle and adapter nut and including a portion radially movable into and away from said peripheral groove.

3. A cutting torch holder adapted to slide on the surface of the work comprising, a pair of transversely spaced runners for engaging the surface of the work, a vertically disposed protractor plate coupled transversely between said spaced runners, a cradle member disposed above and between said runners, means intercoupling said cradle member and said protractor plate providing radial and angular movement of said cradle relative to the axis of said protractor plate, said cradle member having a hole formed therein for receiving a torch tip, said spaced runners extending from said protractor plate along curved paths describing diametrically opposed arcs of a circle having a constant radius from the axis of said hole and having outwardly disposed lateral guide surfaces for guiding abutment with a template edge, an adapter nut threadedly coupled with said torch for coupling the torch tip thereto and having a shoulder portion resting on top of said cradle for limiting insertion of said adapter nut therethrough and a peripherally grooved portion adapted to be disposed in said hole, and plunger means threadedly coupled to said cradle for selectively coupling or uncoupling said cradle and adapter nut and including a plunger end portion radially movable into and away from said peripheral groove.

LOUIS K. BULLMAN.
SHIRL UNDERWOOD.

REFERENCES CITED

The following references are of record in the file of this patent:

UNITED STATES PATENTS

| Number | Name | Date |
| --- | --- | --- |
| 859,664 | Jottrand et al. | July 9, 1907 |
| 1,141,560 | Lack | June 1, 1915 |
| 1,351,846 | Forster | Sept. 7, 1920 |
| 1,553,508 | Cloud | Sept. 15, 1925 |
| 1,773,048 | Linke | Aug. 12, 1930 |
| 1,852,413 | Hickey | Apr. 5, 1932 |

FOREIGN PATENTS

| Number | Country | Date |
| --- | --- | --- |
| 787,758 | France | July 16, 1936 |
| 549,923 | Great Britain | Dec. 14, 1942 |